July 9, 1963 L. B. GREEN 3,097,125
METHOD OF FABRICATING A GLASS FIBER REINFORCED
PLASTIC LUMINAIRE GLOBE
Filed Feb. 2, 1960 2 Sheets-Sheet 1

INVENTOR
LAWRENCE B. GREEN
BY Sellers and Latta
ATTORNEYS

July 9, 1963  L. B. GREEN  3,097,125
METHOD OF FABRICATING A GLASS FIBER REINFORCED
PLASTIC LUMINAIRE GLOBE
Filed Feb. 2, 1960  2 Sheets-Sheet 2
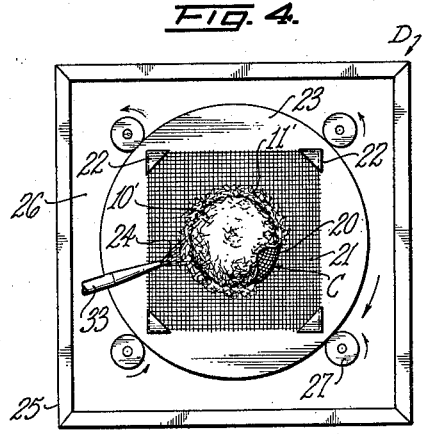
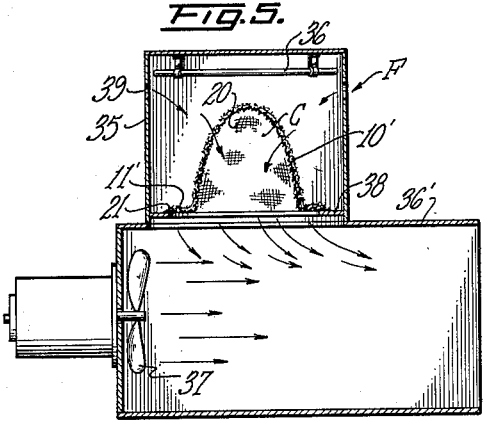
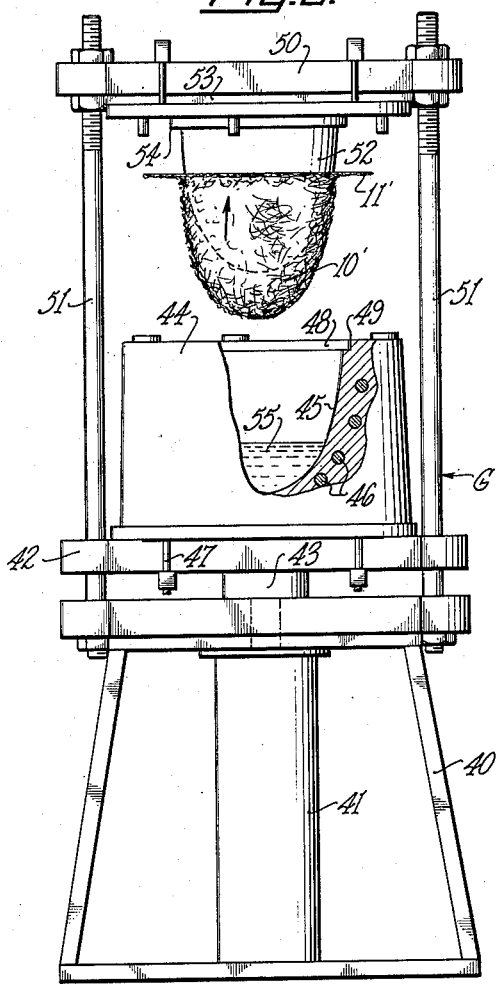
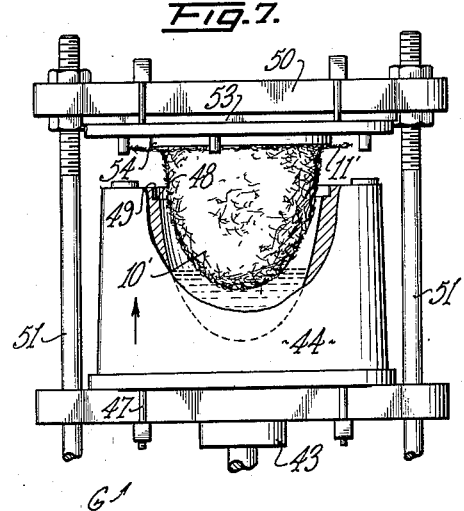
INVENTOR
LAWRENCE B. GREEN
BY Sellers and Latta
ATTORNEYS

United States Patent Office 3,097,125
Patented July 9, 1963

3,097,125
METHOD OF FABRICATING A GLASS FIBER REINFORCED PLASTIC LUMINAIRE GLOBE
Lawrence B. Green, Glendale, Calif., assignor to Plastic Age Sales Inc., Saugus, Calif., a corporation of California
Filed Feb. 2, 1960, Ser. No. 6,233
3 Claims. (Cl. 156—38)

This invention relates to electric lamp globes such as are utilized in covering suspended electric lamps on street-lighting luminaires and electroliers.

The general object of the invention is to provide, a translucent light globe, which may approach clear transparency, having a greatly increased toughness, flexibility and strength to resist impact-fracture as contrasted to the glass globes commonly used for this purpose.

In general, the invention provides a light transmitting globe having an improved wall structure of resin-impregnated felted or matted glass fiber, having an extremely high impact strength and resisting not only fracture but also cracking, scoring, crazing, weathering and other changes which would tend to impair its light-transmitting clarity.

A primary object of the invention is to provide a light globe for street lighting fixtures which will completely resist breakage or cracking under the impact of stones and light objects thrown by children indulging in mischievous fun, or adults intent upon extinguishing the illumination of a lighted area of a street; thus effecting great savings to municipal street departments and other governmental agencies charged with the responsibility of maintaining street lighting. In some areas, maintenance costs on luminaires and electroliers are extremely high as a result of vandalism, in which ordinary glass globes are in some instances broken almost as rapidly as they can be replaced by maintenance crews. The invention, in providing a globe which cannot be broken by hand-thrown stones, rocks, etc., can save the tax payers almost 100 percent of the cost of replacement of light globes, in those areas where vandalism is highly incident.

A further object is to provide a method of fabricating such a light globe, for the attainment of (a) maximum wetting of the glass fibers by the resin binder; (b) maximum contact of the binder with the glass; (c) maximum filling of all inter-fiber spaces in the glass matrix, by the resin binder; (d) maximum strength; and (e) maximum transparency, all in a combination of these characteristics in a single resin-impregnated glass fiber mat wall structure, the transparency being slightly on the translucent side.

Other objects and advantages will become apparent in the ensuing specification and appended drawing in which:

FIG. 4 is a plan view of the form-holding-suction unit;

FIG. 5 is a sectional view showing the matrix-curing stage of the process;

FIG. 6 is a front elevational view of the molding apparatus, partially in section; and FIG. 7 is a view illustrating the molding stage of processing my improved globe.

The Globe Structure

Figure 1:
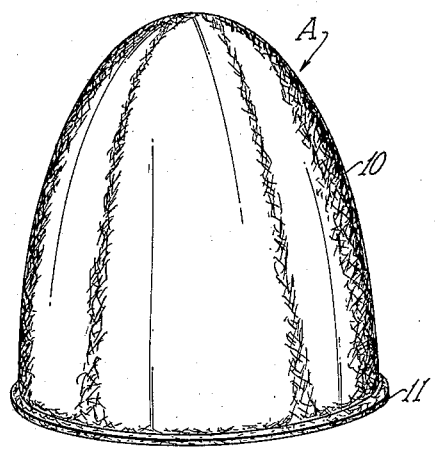
FIG. 1 is a perspective view of a luminaire globe embodying my invention, in an inverted position.
Figure 2:
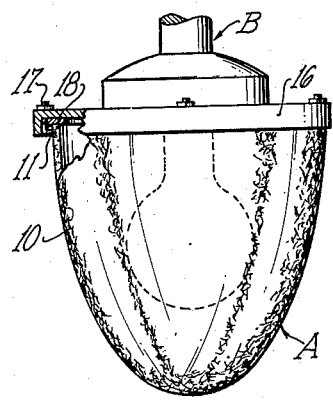
FIG. 2 is a side view of the globe, partially in section, as installed on a luminaire standard.
Figure 1A:
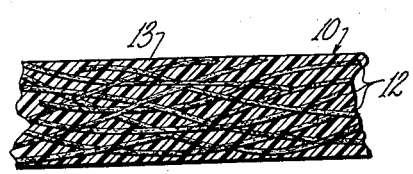
FIG. 1a is a fragmentary sectional view of the wall structure of the globe, on a magnified scale.

Referring now to the drawings in detail, I have shown, in FIG. 1, as an example of one form of light globe in which the invention may be embodied, a luminaire globe having, in general, a hollow body 10 of bullet nose cone shape, and a marginal rim flange 11 at the open end thereof, for attaching the globe to the luminaire. As shown in FIG. 1a, the wall structure of the globe is composed of a glass fiber matrix comprising a series of transparent glass fibers 12 matted together, and a body 13 of resin permeating all interstices between the fibers 12 and providing respective smooth, transparent faces on both sides of the wall structure 10. The matted structure of fibers 12 and the smooth faces of the binder body 13 are both attained by molding the impregnated matrix between smooth faces of a mold, and curing the material in the mold. The indices of light refraction of the glass fibers 12 and of the resin body 13 are matched to as nearly as possible the same value for maximum transparency. The fibers 12 are of a low-expansion borosilicate type glass with a relatively high content of boric oxide and lead associated with a lower silica content than is present in the brittle glasses. With such a borosilicate glass, best results are obtained by using a special isophthalic polyester resin, for matching of light refraction indices. The matrix 12 is highly compressed, and the binder 13 is in full wetting contact with all of the matrix fibers and completely fills the inter-fiber spaces with an absence of gas bubbles (which would seriously impair the transparency of the material). The resin body 13 is substantially clear (colorless) thus avoiding any noticeable contrast between the glass fibers and the resin. In the resulting composite structure, because of the matching of color and refraction indices, the glass fibers are almost invisible.

The wall structure of the globe is extremely tough, of low elasticity, slightly flexible (to yield to extreme vibration, jar and shock without being fractured, cracked, or otherwise damaged) and yet at the same time is hard and rigid so as to fully resist indentation under sharp and fairly heavy blows, and to permanently retain its smooth, symmetrical rounded contour over long periods of usage (years) without breakage, cracking, crazing or other form of deterioration.

In use, the globe A is inverted from its position shown in FIG. 1, its open end, surrounded by flange 11, is directed upwardly, receiving and enclosing an electric lamp suspended in a socket of a luminaire standard B and extending downwardly therefrom, and the flange 11 is received in and sealed to a cap 16, by means of clamps 17, with a suitable gasket 18 interposed between the flange 11 and the cap 16, for effecting a dust-excluding seal between the globe and the cap.

Method of Fabricating

In general, my improved luminaire globe A is fabricated by a series of steps wherein the matrix of glass fibers is first shaped upon a porous form C on a suction box D having means for rotating the form, the glass fibers being sprayed from a chopper-spray unit E to build up on the form C a hat-shaped mat of glass fibers which are temporarily bound together by a binder sprayed thereon intermittently between stages of fiber-spraying operation, whereby the fiber matrix 12 is developed; the matrix subsequently being cured by baking and withdrawal of binder solvent vapors in a combined oven and suction unit F (FIG. 5); and the matrix finally being impregnated with resin and molded in a molding unit G (FIGS. 6 and 7) and being cured by the application of heat in the mold G and trimmed in the final closing of the mold.

Figure 3:
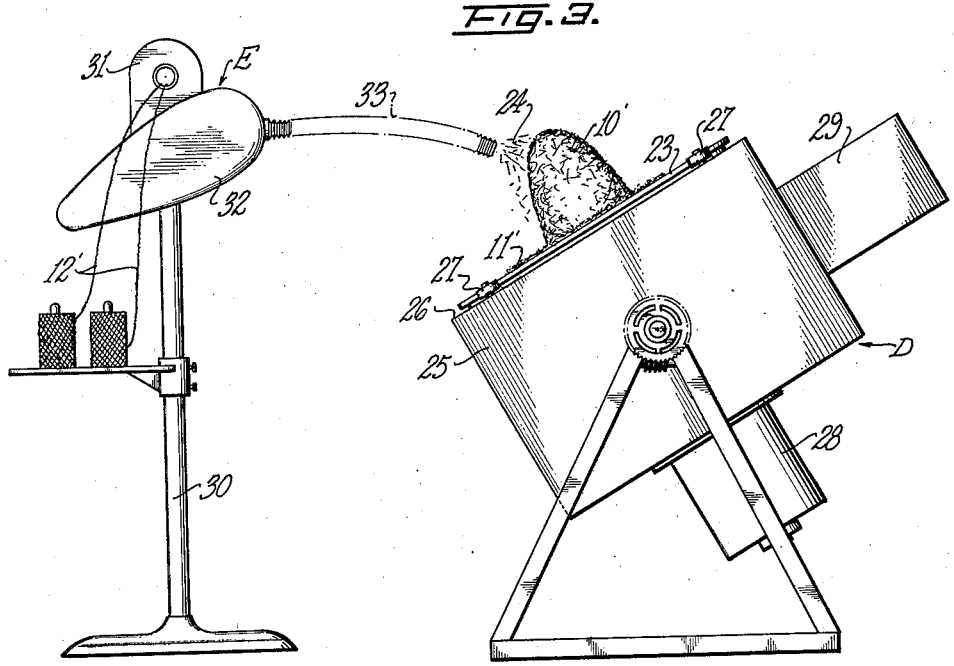
FIG. 3 is a side view illustrating an early stage of the process of fabricating my improved light globe.

*Apparatus.*—To illustrate apparatus that can be utilized in the fabrication of the globe A, I have shown herein, apparatus including (FIGS. 4 and 5) a hat-shaped air porous form C of open mesh woven wire or equivalent (such as perforated metal) including a dome portion 20 for determining the contour of the interior of the globe, and a flat flange 21 which may be square as shown, with its corners adapted to be fitted into shallow holding pockets 22 on the upper face of a turntable 23 of a form-holding and suction unit D by means of which the form may be rotated while glass fibers are sprayed against it in a spray 24 issuing from the nozzle of a blower unit E (FIG. 3).

The form holding-suction unit D includes a suction box 25 having a top wall 26 with a central opening (not shown) covered by the turntable 23. A suitable drive mechanism such as a series of friction drive rolls 27 driven from a drive motor 28, are utilized for rotating the turntable 23. A suction fan unit 29, attached to another wall of the box 25 (e. g. the bottom wall as indicated in FIG. 3) is operative to evacuate air from the suction box 25, creating suction whereby air is drawn through the opening in top wall 26 and through a smaller opening (not shown) in the center of turntable 23 and thus through the open mesh of the form C.

The blower unit E may be of any approved construction including a suitable supporting stand 30, a chopper 31 for drawing strands of glass fiber 12' from suitable supply sources, and chopping them into short fibers which are drawn by suction into a blower unit 32 from which the fibers are blown on an air stream through a suitable flexible nozzle 33.

The curing unit F comprises an oven 35 in which is suitably supported a heating element 36 such as an infrared heating element (illustrated) or a high (radio) frequency heater. The oven 35 has an open side attached to a correspondingly open side of a suction box 36' in which suction is developed by the operation of a suitable fan unit 37. The housing 35 is further provided with a suitable seat 38 upon which the flange portion 21 of the form C may be supported, the seat 38 defining a central opening through which air is drawn into the suction box 36' after passing through the matrix 10', 11'. Suitable openings 39 for admitting air to the oven about the crown of the matrix, are provided; and the housing 35 is provided with a door (not shown) through which the form C with the matrix thereon may be inserted and removed.

The molding unit G comprises a base 40 having a suitable cylinder-piston type fluid (e.g. hydraulic) actuator 41 incorporated therein. A bed 42 is carried by the upper end of the piston 43 of the actuator 41. A female mold 44 having a properly shaped cavity 45 therein and a suitable conduction heating element 46 incorporated therein, is suitably anchored to the bed 42 as by clevis bolts 47. At the mouth of the cavity 45, mold 44 has a counterbore 48 which intersects the upper face of the mold to define a shearing lip 49. An overhead yoke 50 is supported and tied down to the base G by tie rods 51. A male form 52 has at its upper end a header plate 53 which is anchored to the yoke 50. At the under side of plate 53 is a male shearing punch 54 in the form of a flange which enters the counterbore 48 and cooperates with the lip 49 for trimming the flat rim 11' of the matrix.

*Processing—Shaping the Mat*

In shaping the mat 10', 11', the workman operates the unit D to rotate the turntable 23 and simultaneously manipulates the nozzle 33 to direct the stream of glass fibers 24 onto the form C. As the fibers approach the surface of the form, they will come under the influence of the currents of air being drawn radially inwardly through the mesh wall of the form and will thereby be drawn and plastered against the form C to form a mat 10' around the dome portion 20 thereof, and extending outwardly against the flange 21 to provide a flat rim portion 11'. The mat body 10' and rim portion 11' together constitute the matrix for the light globe. The blowing of the fibers onto the form is intermittently interrupted, and in the intervals between the blowing stages, the workman sprays onto the fibers (which are held against the form by continued operation of the suction unit 29) a liquid solution of a binder adhesive which causes the fibers to adhere to one another.

The binder is preferably a resin that is color-matched and matched as to light refraction index, to the glass of the fibers 12. Satisfactory results are obtained by using, as the binder, a polyester resin thinned down with a compatible diluent. The binder solution is sprayed onto consecutive layers of fibers intermittently with the spraying of additional layers of glass fibers from the spray unit E and while suction is continuously applied to the suction box 25 so as to continue to hold the fibers against the form C and to draw air currents through the fibers. The air currents moving inwardly through the mat of fibers draw the binder inwardly into contact with layers of fibers beneath the surface layers so as to thoroughly distribute the bonds between cross fibers, throughout the depth of the fiber mat. The circulation of air through the fibers also draws off most of the solvent and drys the binder so as to temporarily bond the fibers together in a matrix which retains to a large extent the porous character of the layers of fibers as they are drawn against the form by the air currents.

The alternate spraying of layers of fiber and binder onto the form is continued until a selected mat depth is attained. This depth is several times the wall thickness of the globe A in its finished form, and allows for condensing the matrix by compression in the mold during the final molding operation.

*Curing the matrix.*—After the preliminary forming of the matrix on the form C has been completed, the form, with the matrix thereon, is inserted into the oven 35, the door is closed to seal the oven, and the fan 37 and heating unit 36 are operated to simultaneously heat and draw air through the matrix, drawing off the residual solvent and curing the binder. Simultaneously, the pressure of the air against the outer surface of the matrix, as it is drawn therethrough, compacts the matrix and reduces the wall thickness thereof by contracting the external diamter down to a diameter such that the matrix will freely enter the mold. This intermediate stage of contracting the matrix makes it possible to incorporate into the final wall structure of the globe, within the permitted wall thickness thereof, a considerably greater amount of glass fiber than would otherwise be attainable. There is a resulting increase in impact strength, toughness, resistance to cracking and durability in general. Discoloration through aging is reduced because of the proportionately smaller content of resin in the wall structure.

After the matrix has been cured in the curing unit F, it is removed therefrom and is ready for the final molding operation. The cured matrices can be stored for a period of time before molding, if such becomes desirable in coordinating the several operations, or if necessary or desirable, can be immediately subjected to the molding operation.

*Molding.*—Just before inserting the matrix into the molding unit G, it is preheated to a temperature approximately the same as the temperature of the mold 44 and male form 52 (which is sufficiently high to initiate the gelling of the resin). This preheating of the matrix avoids premature chilling of the resin at the outer surface of the matrix upon contact therewith.

In the molding operation, a matrix is pushed upwardly over the male form 52 after the mold 44 has been lowered to its lower limit position (FIG. 6) providing sufficient clearance for the application of the matrix to the form. A measured quantity of liquid resin 55, in an amount ample to permeate the matrix throughout its entire area, is poured into the female mold 45. The resin is a heat-curing resin having substantially the same characteristics as the binder coating the fibers of the matrix, and having an affinity therefor so as to readily unite therewith in the curing operation. Satisfactory results are obtained by utilizing unthinned polyester resin in a thick, syrupy consistency.

The hydraulic actuator 41 is operated to elevate the mold 44 with an upward movement of graduated speed, beginning with a relatively rapid rise to a point where the lower extremity of the matrix enters the pool of resin 55 in the mold, followed by an intermediate state of slower movement in which the resin 55 is extruded upwardly around the side of the matrix and into the pores thereof.

In the early stage of the molding operation, heat is transferred from the preheated mold 44 to the pool of resin 55, and gelation starts in the outer layer of resin in direct contact with the wall of cavity 45. As the molding operation progresses, the exothermic reaction, triggered by the conducted heat, generates added heat within the resin. The preheat temperature of the mold is lower than the temperature which is finally attained in the exothermic reaction, and in the later stage of the reaction, the direction of heat transfer is reversed, heat being conducted outwardly from the resin into the cooler wall of the mold 44, thus reducing and controlling the acceleration of gelation under the exothermic reaction, to maintain fluidity of the upwardly extruding portion of the resin sufficiently to provide for its flowing to the top of the mold and through the porous matrix into contact with the male form 52. It is the ungelled resin from the interior of the pool 55 which thus flows upwardly and progressively gels along the walls of the mold and male form.

As the resin is extruded upwardly between the wall of the mold and male die, it drives ahead of it the air and moisture that have occupied the pores of the matrix. This scavenging operation is improved by maintaining the pores of the matrix open as the result of the preheating step described above.

As the shearing flange 54 enters the counterbore 48, is closes the top of the mold 44 so as to completely confine the resin and place it under pressure. Simultaneously the shearing flange 54 cooperates with the lip 49 to trim off the excess peripheral material of the flange 11', leaving the relatively narrow flange 11 shown in FIG. 1. This stage of operation, commencing with the shearing operation and the closing of the mold, involves a further reduction in the speed of elevation of the mold 44, the movement from this point on being almost imperceptible. Over a period of time which may range from 20 seconds up to a minute, the closing movement continues, the resin being placed under compression and forced entirely through the porous matrix and against the surface of male form 52, which, like the mold 44, is heated by suitable internal heating elements.

The matching of color and light-refraction indexes of the glass fibers and plastic body of the globe is somewhat less than complete, with the result that there is a minor amount of light ray refraction, such that the globe wall, instead of being completely transparent, has a slightly clouded, translucent character sufficiently to prevent full, clear view through the globe, and to slightly fog the view of the light bulb within the globe, thus giving a more pleasing appearance.

I claim:

1. A method of fabricating a luminaire globe, comprising the following steps; intermittently blowing, in a manually-directed spray, onto the external surface of an exposed, rotating, air porous, hat-shaped form, succeeding layers of glass fibers while drawing air inwardly through the air porous wall of said form to hold the fibers in a mat adhering to the form; binding said fibers to one another by manually-directed spraying onto the succeeding layers, during intervals between successive blowing steps, a thin solution of a binder resin, and air-drying the same to convert it into a thin film of strong, tough resin coating said glass fibers and providing integral bridging bonds binding the fibers to one another at points of crossing but leaving interstices between the fibers, whereby to provide a form-retaining highly porous matrix having the general form of the finished globe; preheating the matrix and pressing it, in the preheated condition, onto the male die of a mold comprising male and female dies arranged for closing movement on a vertical axis, with the open end of the female die at the top thereof and the male die disposed above the same; injecting a pool of liquid resin into the female die cavity; closing the mold with a relatively rapid movement so as to cause the matrix to be inserted into the female die and into said resin pool and to displace the resin upwardly between the walls of the molds; continuing the closing with a relatively slow closing movement causing the liquid resin to be extruded upwardly between the mold walls and into the interstices of the matrix so as to fill the same; and, in the last stages of closing movement, forcing the resin to flow substantially entirely within the porous wall structure of the matrix, parallel to the mold walls, in a manner to scavenge before it, air entrained within the matrix to eliminate air bubbles, applying compression to the matrix as thus impregnated with resin, compacting the matrix to a wall thickness substantially less than its thickness before insertion into the mold, and maintaining such compressing while subjecting the impregnated matrix to heat until the resin is cured, whereby to produce a globe of compacted wall structure of extremely high impact strength and with smooth wall surfaces of high light-transmitting character and with the glass fibers substantially invisible within the resin body of the globe; and then removing such globe from the mold.

2. The method defined in claim 1, including the step of trimming the rim of the globe between the male and female die members in the final stage of closing of the mold, whereby the globe is in a finished condition as removed from the mold.

3. The method defined in claim 1, including the further initial steps of selecting and using glass fibers of a low-expansion borosilicate type glass with a high content of boric oxide and lead and a low silica content, and using a substantially transparent isophthalic polyester organic plastic material for the resin body of the globe, with the indexes of refraction of said glass fibers and resin material being substantially matched, whereby in the compacted wall structure of the finished filobe the glass fibers are substantially invisible and the globe is substantially transparent.

References Cited in the file of this patent

UNITED STATES PATENTS

| 2,311,613 | Slayter | Feb. 16, 1943 |
| 2,378,642 | Kopplin | June 19, 1945 |
| 2,526,945 | Gray | Oct. 24, 1950 |
| 2,541,297 | Sampson et al. | Feb. 13, 1951 |
| 2,587,814 | Borkland | Mar. 4, 1952 |
| 2,613,397 | Borkland | Oct. 14, 1952 |
| 2,702,261 | Bacon et al. | Feb. 15, 1955 |

FOREIGN PATENTS

| 721,892 | Great Britain | June 12, 1955 |
| 791,976 | Great Britain | Mar. 19, 1958 |

OTHER REFERENCES

"Low-Pressure Laminating of Plastics," Hicks, Reinhold Publishing Corp., 330 W. 42nd St., New York, U.S.A., 1947, pages 29 and 120–124 relied on.

"Fiberglas Reinforced Plastics," Sonneborn et al., 1954, Reinhold Publishing Corp., New York, N.Y., pages 47–61 relied on.

"Laminated Plastics," Duffin et al., 1958, Reinhold Publishing Corp., New York, pages 28 and 65–69 relied on.

Polyesters and Their Applications, by Bjorksten, Research Laboratories, Inc., 1956, Reinhold Publishing Corporation, New York, pages 165 and 166 relied on.